United States Patent
Lee et al.

(10) Patent No.: US 10,767,575 B2
(45) Date of Patent: Sep. 8, 2020

(54) CONTROL SYSTEM AND METHOD FOR FUEL INJECTION BY PREDICTING ENGINE NOISE

(71) Applicants: Hyundai Motor Company, Seoul (KR); Kia Motors Corporation, Seoul (KR)

(72) Inventors: Seung-Hyun Lee, Suwon-si (KR); In-Soo Jung, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/422,245

(22) Filed: May 24, 2019

(65) Prior Publication Data

US 2020/0109672 A1    Apr. 9, 2020

(30) Foreign Application Priority Data

Oct. 8, 2018    (KR) .......................... 10-2018-0119945

(51) Int. Cl.
| | |
|---|---|
| *F02D 35/02* | (2006.01) |
| *F02D 41/38* | (2006.01) |
| *F02D 41/26* | (2006.01) |
| *F02D 35/00* | (2006.01) |

(52) U.S. Cl.
CPC ....... *F02D 35/023* (2013.01); *F02D 35/0092* (2013.01); *F02D 41/26* (2013.01); *F02D 41/38* (2013.01); *F02D 2200/024* (2013.01); *F02D 2200/025* (2013.01); *F02D 2200/0806* (2013.01); *F02D 2200/101* (2013.01)

(58) Field of Classification Search
CPC ...... F02D 35/027; F02D 35/023; F02D 41/38; F02D 41/26; F02D 35/0092; F02D 2200/101; F02D 2200/024; F02D 2200/025; F02D 2200/0806
USPC ...................... 123/406.26, 406.29
See application file for complete search history.

(56) References Cited

U.S. PATENT DOCUMENTS

| | | | | |
|---|---|---|---|---|
| 2007/0277780 | A1* | 12/2007 | Akazaki | ............... F02D 35/028 123/406.22 |
| 2008/0033629 | A1* | 2/2008 | Remelman | ............ F02D 35/027 701/111 |
| 2011/0093186 | A1* | 4/2011 | Hagari | ............... F02D 41/0002 701/111 |

(Continued)

FOREIGN PATENT DOCUMENTS

KR    10-2005-0069078 A    7/2005

*Primary Examiner* — Sizo B Vilakazi
(74) *Attorney, Agent, or Firm* — Morgan, Lewis & Bockius LLP

(57) ABSTRACT

A control system for fuel injection by predicting engine noise may include an engine noise predicting device configured to derive a predicted engine noise value in real time by a predicted engine noise coefficient which is pre-stored according to a currently measured combustion pressure value of an engine; and a combustion controller configured to determine a difference between the real-time predicted engine noise value derived by the engine noise predicting device and a target engine noise value for a current operation condition of the engine, and when the engine noise is determined as being degraded due to an abnormal combustion, configured to change the target engine noise value to control fuel injection according to the changed target engine noise value.

16 Claims, 12 Drawing Sheets

(56) References Cited

U.S. PATENT DOCUMENTS

| | | | |
|---|---|---|---|
| 2012/0048234 A1* | 3/2012 | Hamama | F02D 41/0025 |
| | | | 123/436 |
| 2014/0012487 A1* | 1/2014 | Jung | F02D 35/023 |
| | | | 701/104 |
| 2015/0219027 A1* | 8/2015 | zur Loye | F02D 19/081 |
| | | | 60/603 |
| 2016/0025032 A1* | 1/2016 | Jung | F02D 35/028 |
| | | | 701/104 |
| 2016/0123249 A1* | 5/2016 | Sakayanagi | F02D 35/023 |
| | | | 701/111 |
| 2020/0109672 A1* | 4/2020 | Lee | F02D 41/38 |

* cited by examiner

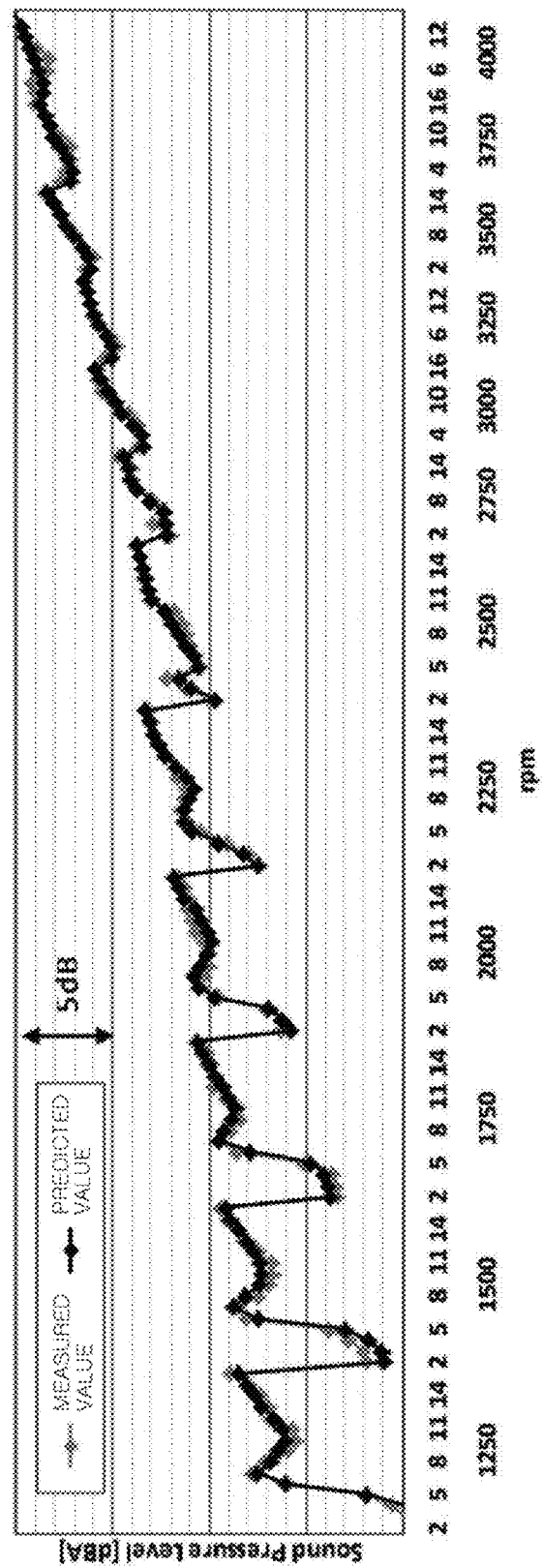

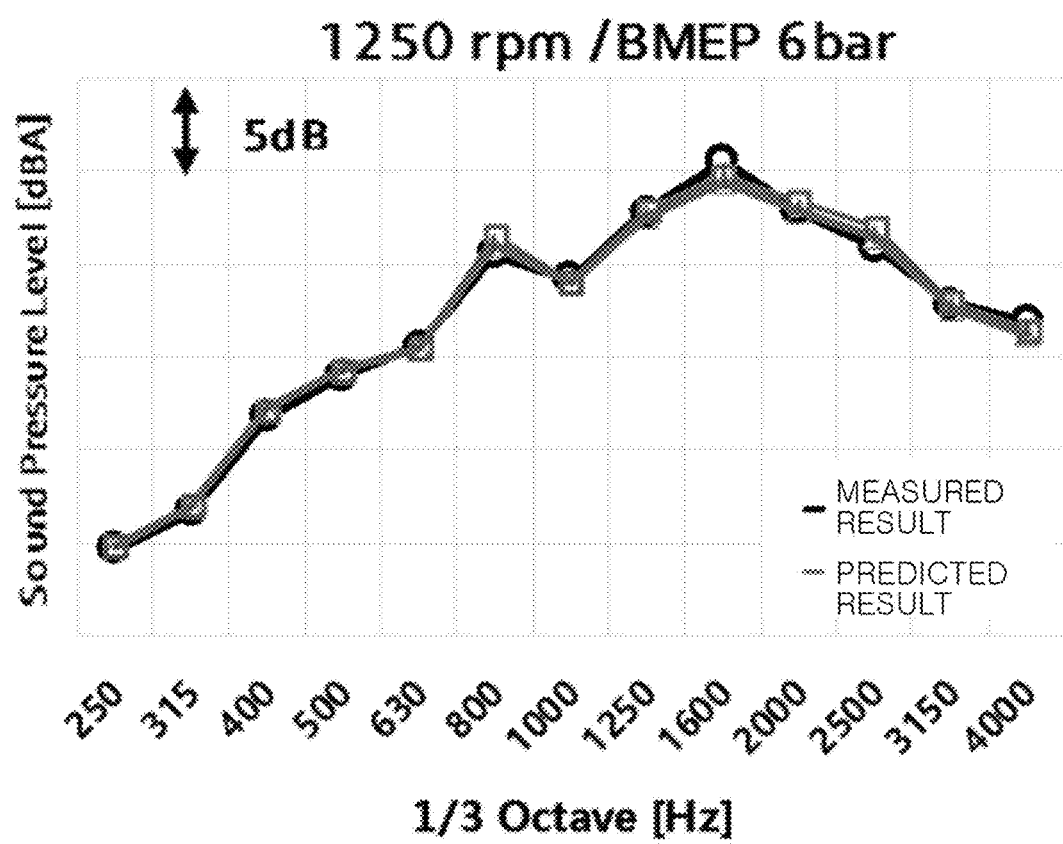

CONTROL SYSTEM AND METHOD FOR FUEL INJECTION BY PREDICTING ENGINE NOISE

CROSS-REFERENCE(S) TO RELATED APPLICATIONS

The present application claims priority to Korean Patent Application No. 10-2018-0119945, filed on Oct. 8, 2018, the entire contents of which is incorporated herein for all purposes by this reference.

BACKGROUND OF THE INVENTION

Field of the Invention

The present invention relates to a control system and a control method for fuel injection. More particularly, it relates to a control system and a control method for fuel injection by predicting an engine noise.

Description of Related Art

An engine of a vehicle is a device for converting energy generated by combusting fuel into mechanical energy allowing the vehicle to move. An amount and an interval of fuel injection into the engine are controlled in consideration of a fuel amount efficiency, an exhaust gas, noise, vibration, and harshness (NVH), a load, and the like.

Thus, the fuel injection is controlled by a mapped reference coinciding with the above-described requirements. Even though the fuel injection is controlled by a predetermined reference, it cannot actively respond to degradation of NVH performance due to a combustion characteristic which is varied resulting from changes in durability and an environment.

That is, since a fuel injection parameter of the engine is open-loop control based on calibration in a related art, only partial correction control on a fuel amount is possible with respect to degradation in durability of an injector through learning and correction of a fuel injection of pilot injection.

The information disclosed in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a control system and a control method for fuel injection by predicting engine noise, which are configured for improving noise, vibration, and harshness (NVH) performance and fuel efficiency and optimizing an exhaust gas by adaptively controlling fuel injection into a combustion chamber of an engine in real time.

Other objects and advantages of the present invention may be understood by the following description and become apparent with reference to the exemplary embodiments of the present invention. Also, it is obvious to those skilled in the art to which the present invention pertains that the objects and advantages of the present invention may be realized by the means as claimed and combinations thereof.

In accordance with various exemplary embodiments of the present invention, a control system for fuel injection by predicting engine noise, the noise control system including an engine noise predicting device configured to derive a predicted engine noise value in real time by a predicted engine noise coefficient which is pre-stored according to a currently measured combustion pressure value of an engine, and a combustion controller configured to determine a difference between the real-time predicted engine noise value derived by the engine noise predicting device and a target engine noise value for a current operation condition of the engine, and when the engine noise is determined as being degraded due to an abnormal combustion, configured to change the target engine noise value to control fuel injection according to the changed target engine noise value.

The combustion controller may acquire the target engine noise value for the current operation condition of the engine by a map of a target engine noise value pre-stored in an electronic control unit (ECU).

When the difference between the real-time predicted engine noise value derived and the target engine noise value for the current operation condition of the engine is equal to or greater than a threshold, the combustion controller may be configured to determine the engine noise as being degraded due to the abnormal combustion.

The combustion controller may change injection parameters including a main injection time and an injection pressure according to the changed target engine noise value, controlling the fuel injection.

The predicted engine noise coefficient may include data obtained by mapping the predicted engine noise value according to the combustion pressure of the engine.

The predicted engine noise coefficient may include data obtained by mapping the predicted engine noise value according to operation conditions of the engine including the number of revolutions of the engine and a load thereof.

The noise control system may further include an engine measuring device configured to generate an optimal model for fuel efficiency and discharge by modeling a fuel efficiency value, a $NO_x$ value, and a particle matter (PM) value which are measured according to the predicted engine noise value.

The combustion controller may be configured to determine predicted values of the fuel efficiency value, the $NO_x$ value, and the PM value which correspond to the changed injection parameters according to the optimal model for fuel efficiency and discharge and, when the predicted values of the fuel efficiency, the NOx, and the PM satisfy the set thresholds, the combustion controller may be configured to control the fuel injection according to the changed injection parameters.

In accordance with various exemplary embodiments of the present invention, a control method for fuel injection by predicting engine noise, the control method including measuring a current combustion pressure of an engine, deriving a real-time predicted engine noise value according to the current combustion pressure of the engine by a pre-stored predicted engine noise coefficient, deriving a target engine noise value for a current operation condition of the engine, determining a difference between the real-time predicted engine noise value and the target engine noise value for the current operation condition of the engine, and determining whether engine noise is degraded due to an abnormal combustion.

When the difference between the real-time predicted engine noise value and the target engine noise value for the current operation condition of the engine is equal to or greater than a set threshold, the determining of whether the engine noise is degraded due to the abnormal combustion may include determining the engine noise as being in a degraded state.

The control method may further include, when the engine noise is determined as being in the degraded state, changing the target engine noise value and changing injection parameters including a main injection time and an injection pressure according to the changed target engine noise value.

The deriving of the target engine noise value for the current operation condition of the engine may include deriving the target engine noise value by a map of a target engine noise value pre-stored in an electronic control unit (ECU).

The predicted engine noise coefficient may include data obtained by mapping the predicted engine noise value according to the combustion pressure of the engine.

The predicted engine noise coefficient may include data obtained by mapping the predicted engine noise value according to operation conditions of the engine including the number of revolutions of the engine and a load thereof.

The control method may further include determining a fuel efficiency value, a $NO_x$ value, and a particle matter (PM) value which correspond to the changed injection parameters obtained in changing the injection parameters according to an optimal model for fuel efficiency and discharge obtained by modeling values of the fuel efficiency, the $NO_x$, and the PM which are measured according to the predicted engine noise value.

The control method may further include determining whether predicted values of fuel efficiency, $NO_x$, and PM which are determined in determining the predicted values of the fuel efficiency, $NO_x$, and the PM satisfy set thresholds, and when the predicted values of the fuel efficiency, $NO_x$, and the PM satisfy the set thresholds, controlling the fuel injection according to the changed injection parameters.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2A, FIG. 2B, FIG. 3A and FIG. 3B are graphs showing a comparison between a predicted engine noise value and a measured value.

Figure 1:
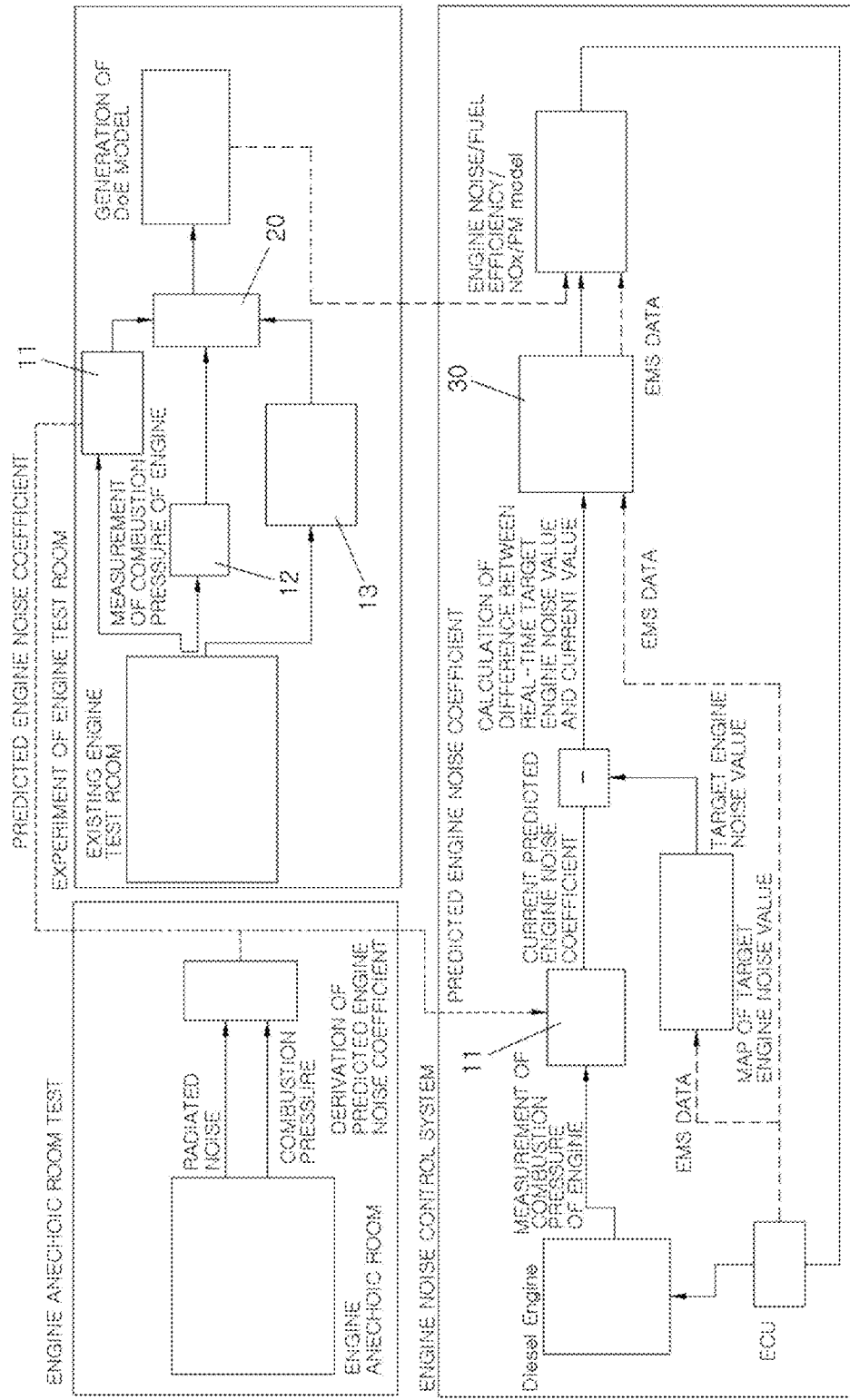
FIG. 1 is a diagram illustrating a fuel injection control system through an engine noise prediction of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference should be made to the accompanying drawings that illustrate exemplary embodiments of the present invention, and to the description in the accompanying drawings to fully understand the present invention and operational advantages of the present invention, and objects attained by practicing the present invention.

In various exemplary embodiments of the present invention, known technologies or detailed descriptions may be reduced or omitted to avoid obscuring appreciation of the disclosure by a person of ordinary skill in the art.

FIG. 1 is a diagram illustrating a fuel injection control system through an engine noise prediction of the present invention. Hereinafter, a fuel injection control system through an engine noise prediction according to an exemplary embodiment of the present invention will be described with reference to FIG. 1.

The fuel injection control system through an engine noise prediction according to an exemplary embodiment of the present invention includes an engine noise predicting device 11, an exhaust gas analyzer 12, a fuel efficiency analyzer 13, an engine measuring device 20, an electronic control unit (ECU), and a combustion controller 30. The fuel injection control system derives a predicted engine noise coefficient according to a combustion pressure of an engine, determines whether the predicted engine noise coefficient coincides with a target engine noise value, and when the predicted engine noise coefficient is determined as not coinciding with the target engine noise value, the fuel injection control system controls fuel injection by correcting the target engine noise value. Furthermore, the fuel injection control system optimizes the corrected target engine noise value to coincide with a design of experiments (DoE) model in consideration of fuel efficiency and an exhaust gas.

The engine noise predicting device 11 measures the combustion pressure of the engine in real time and derives a current predicted engine noise value according to the measured combustion pressure through a previously mapped predicted engine noise coefficient.

The derivation of the predicted engine noise coefficient is derived through an engine anechoic room test.

That is, the predicted engine noise coefficient is derived through measurements of an engine torque, a combustion pressure, and an engine radiated noise in an engine anechoic chamber.

The engine radiated noise according to the combustion pressure is optimized by inputting combustion pressure data and a value obtained through a measurement of engine radiated noise in four directions or various test conditions using a microphone and by performing according to an operation region zone to allow an overall section to be predictable. The engine radiated noise is optimized by forming various noise prediction coefficients according to engine operation conditions (a low speed section, an intermediate load acceleration section, a full load section, and the like).

As such, analysis and prediction coefficients are generated with a ⅓ octave.

Conceptually, $SP_{engine} = SP_{load\ independent\ noise} + SP_{combustion} + SP_{load\ dependent\ noise}$, and the engine radiated noise is as follows.

$$SP = SP_{mech} + H \cdot CP + G \cdot L, \text{ and}$$

SP=sound pressure power, CP=cylinder pressure power, H=transfer coefficient b/w cylinder pressure & combustion noise sound power, G=transfer coefficient b/w torque & load dependent noise, and L=engine torque$^2$.

That is, sound power of the engine radiated noise is equal to the sum of sound power of a direct combustion sound, an indirect combustion sound, and mechanical noise. The direct combustion sound is formed by multiplying cylinder pressure power CP by a direct combustion noise coefficient H, and the direct combustion sound is constituted of the product of the square of an engine torque and a direct combustion sound coefficient G.

Figure 2B:
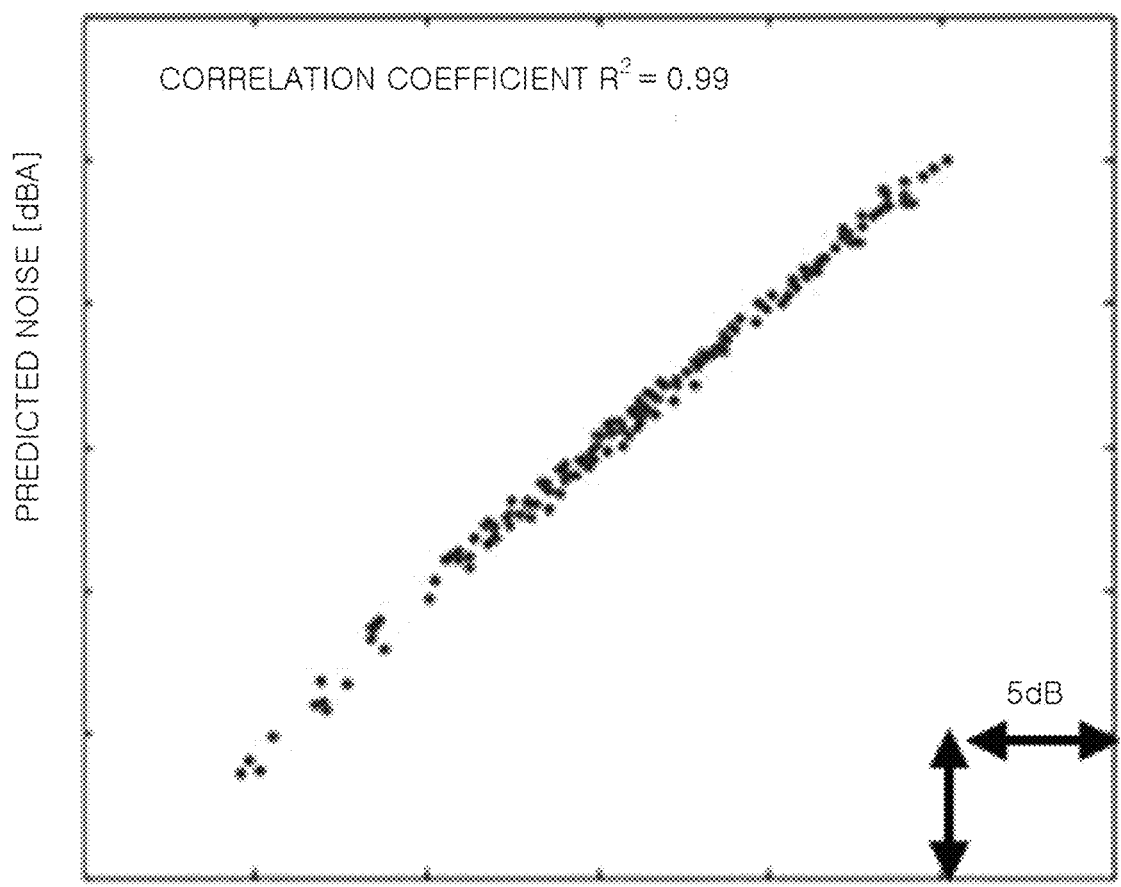
Figure 3B:
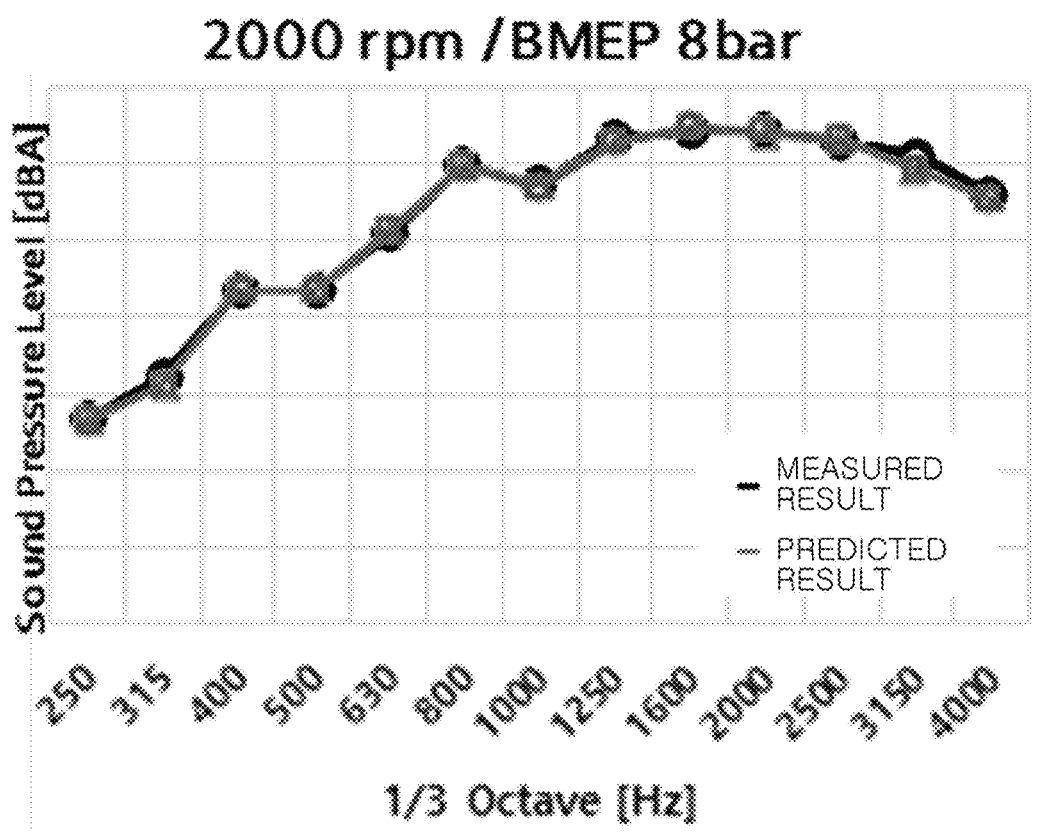

FIGS. 2A to 3B are graphs showing a comparison between a predicted engine noise value and a measured value. FIG. 2A and FIG. 2B are graphs showing a comparison between a measured value and a predicted value of overall engine noise in an entire operating region. FIG. 3A and FIG. 3B are graphs showing results of comparison and analysis with an ⅓ octave.

As shown in the results, the predicted engine noise value obtained through the engine anechoic room test coincides with an actually measured value so that the predicted engine noise value according to the combustion pressure through the engine anechoic room test is derived as a predicted engine noise coefficient, and the predicted engine noise coefficient is stored in the engine noise predicting device 11.

Referring back to FIG. 1, the engine measuring device 20 generates fuel efficiency and an optimal exhaust model (DoE model) through pieces of data derived by the engine noise predicting device 11, the exhaust gas analyzer 12, and the fuel efficiency analyzer 13 (engine calibration system).

Figure 4:
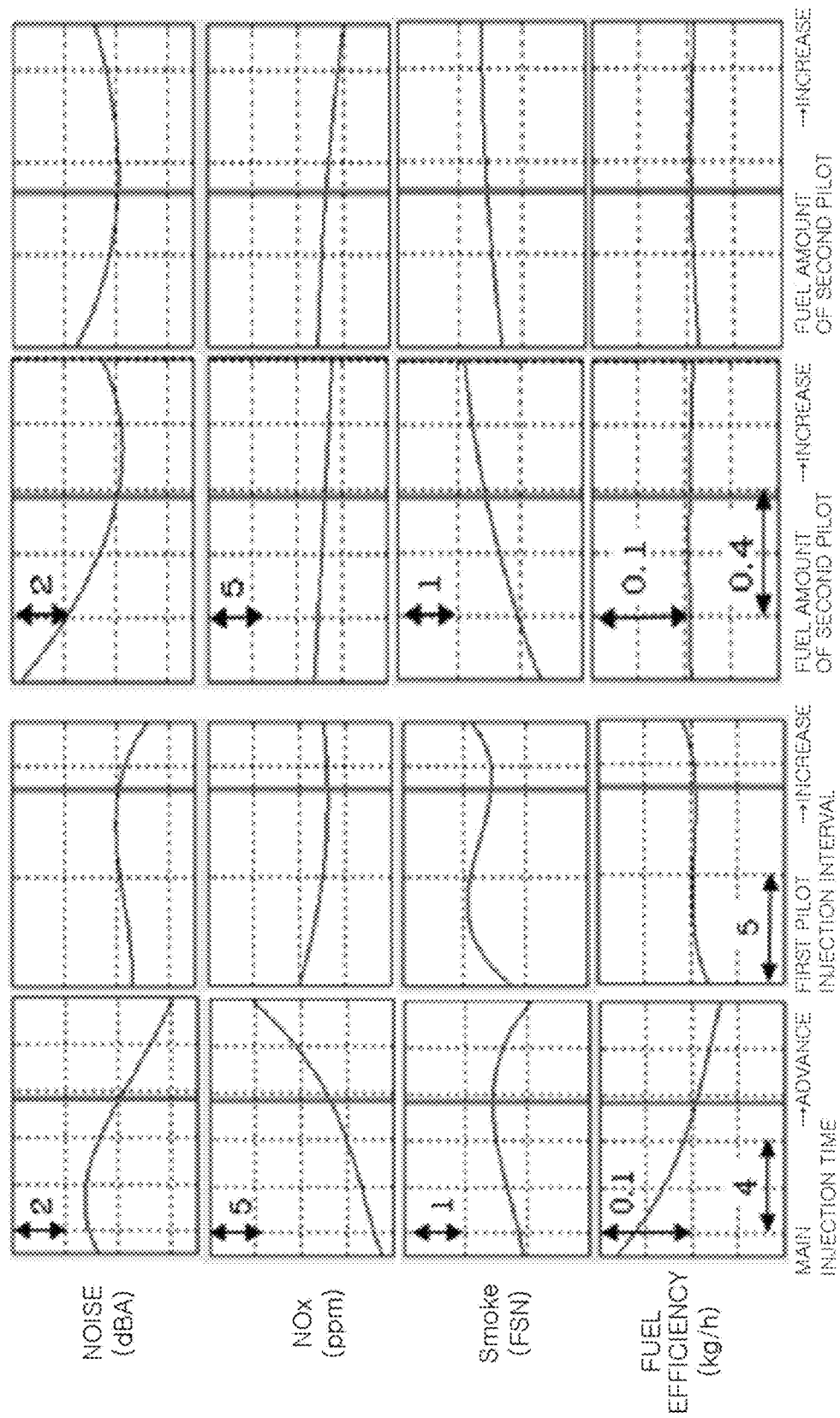
FIG. 4 is a diagram illustrating an example of an optimal design of experiments (DoE) model derived by the present invention.

That is, as the example of FIG. 4, an optimal DoE model according to variations in engine control parameters (a main injection time, an injection pressure, an amount of pilot injection, and the like) in the existing engine test room is generated as a model applicable to an embedded system.

The engine measuring device 20 obtains information on the predicted engine noise coefficient by the engine noise predicting device 11, information on particle matter (PM) and $NO_x$ according to the combustion pressure measured by the exhaust gas analyzer 12 through a test in the existing engine test room, and information on the fuel efficiency according to the combustion pressure measured by the fuel efficiency analyzer 13 through the existing engine test room. The engine measuring device 20 derives a fuel efficiency value, a $NO_x$ value, and a PM value according to the predicted engine noise value on the basis of the above-described information to generate an optimal model (DoE model) for fuel efficiency and discharge.

Figure 5:
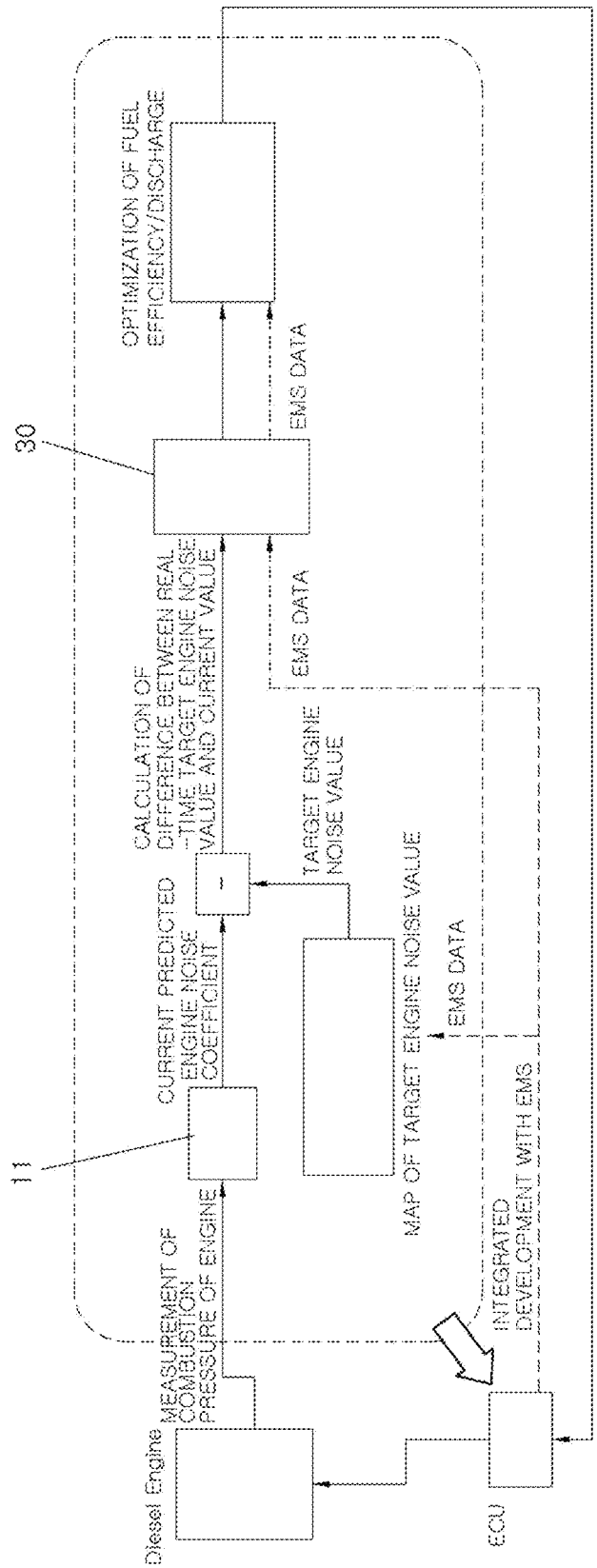
FIG. 5 is a diagram partially illustrating the fuel injection control system through an engine noise prediction of the present invention.

FIG. 5 is a diagram partially illustrating the fuel injection control system through an engine noise prediction of the present invention.

The combustion controller 30 controls the fuel injection according to a map of the target engine noise value on the basis of engine management data (EMS data) from the ECU.

The map of the target engine noise value stored in the ECU is a pre-mapped value and is not an active value, whereas the combustion controller 30 in an exemplary embodiment of the present invention determines a difference between a real-time predicted engine noise value by the engine noise predicting device 11 and a target engine noise value with respect to an operation condition. When the difference is equal to or greater than a threshold, the combustion controller 30 corrects the target engine noise value. Furthermore, when the target engine noise value coincides with the fuel efficiency value, the $NO_x$ value, and the PM value according to the optimal model (DoE model) for fuel efficiency and discharge derived by the engine measuring device 20, the combustion controller 30 controls the fuel injection according to the corrected target engine noise value.

The engine noise predicting device 11 measures the combustion pressure of the engine to derive the real-time predicted engine noise value according to the combustion pressure through the predicted engine noise coefficient. When a difference between the real-time predicted engine noise value and the target engine noise value is equal to or greater than a threshold, the combustion controller 30 determines the difference as being an abnormal combustion causing NVH degradation, controlling the fuel injection.

A real-time engine noise prediction measures a combustion pressure of one cycle and then derives cylinder power through a fast Fourier transform (FFT). The real-time engine noise prediction determines a crank angle by a measurement of a crankshaft position sensor (CKPS), derives an indicated mean effective pressure (IMEP), and then determines a brake mean effective pressure (BMEP).

As such, the predicted engine noise value is determined using the predicted engine noise coefficient corresponding to the operation condition of the engine, and the predicted engine noise value is determined in real time every one cycle.

Meanwhile, the fuel injection control system through the above-described real-time engine noise prediction is configured for performing integrated control based on an integrated control logic for an engine noise prediction, fuel efficiency, and an exhaust gas without adding hardware.

Figure 6:
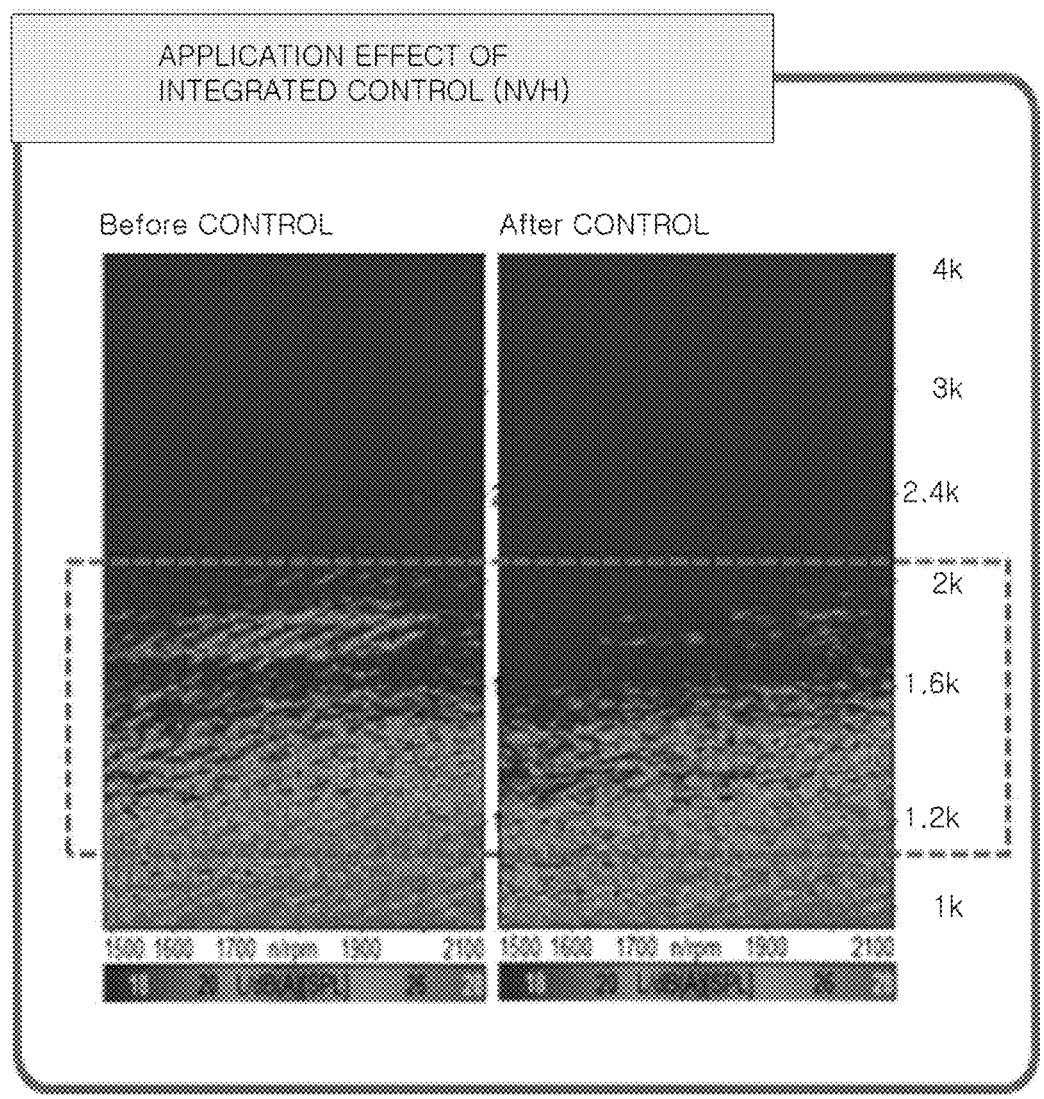
FIG. 6 is a diagram illustrating a comparison between before and after application of the fuel injection control system and fuel injection control method of the present invention.

FIG. 6 is a diagram illustrating a comparison between before and after application of the fuel injection control system of the present invention, and it may be confirmed that the NVH performance is further improved.

Next, a control method for fuel injection by predicting engine noise according to an exemplary embodiment of the present invention will be described with reference to FIGS. 7 to 9B, and a description of specific details described in the description of the fuel injection control system will be omitted.

Figure 7:
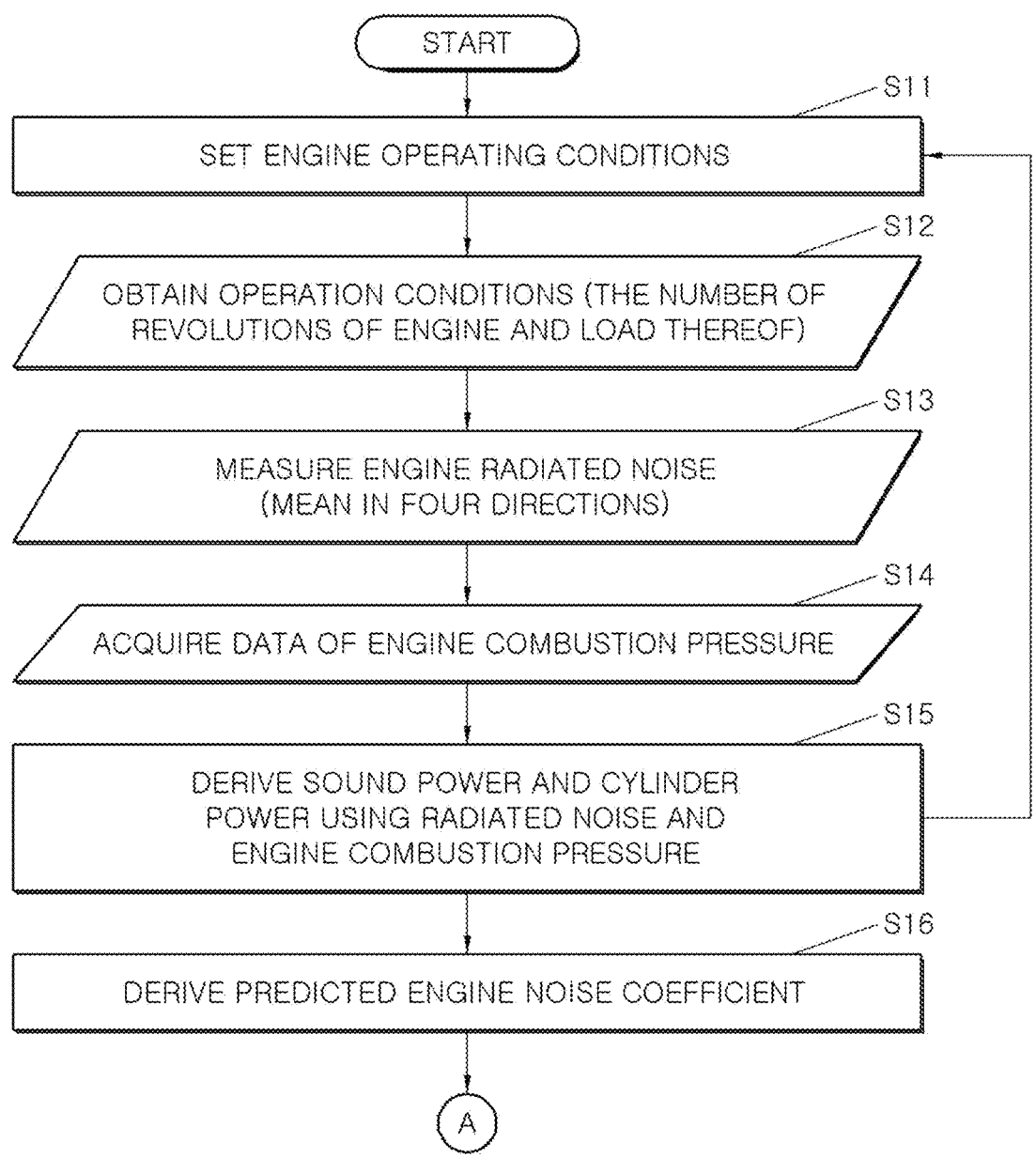
FIG. 7, FIG. 8, FIG. 9A and FIG. 9B are diagrams illustrating a fuel injection control method through an engine noise prediction of the present invention.

FIG. 7 is a flowchart illustrating a process of deriving a predicted engine noise coefficient by an engine anechoic room test.

First, an engine operation condition is set (S11), and conditions (an engine speed, an engine load, and the like) in which the engine operates according to the engine operation condition are obtained (S12).

Thus, an engine radiated noise in corresponding conditions is measured (S13).

As such, data of an engine combustion pressure is acquired (S14).

A predicted engine noise value according to the engine combustion pressure is derived as a predicted engine noise coefficient by deriving sound power and cylinder power using the measured radiated noise and the engine combustion pressure (S15 and S16).

Figure 8:
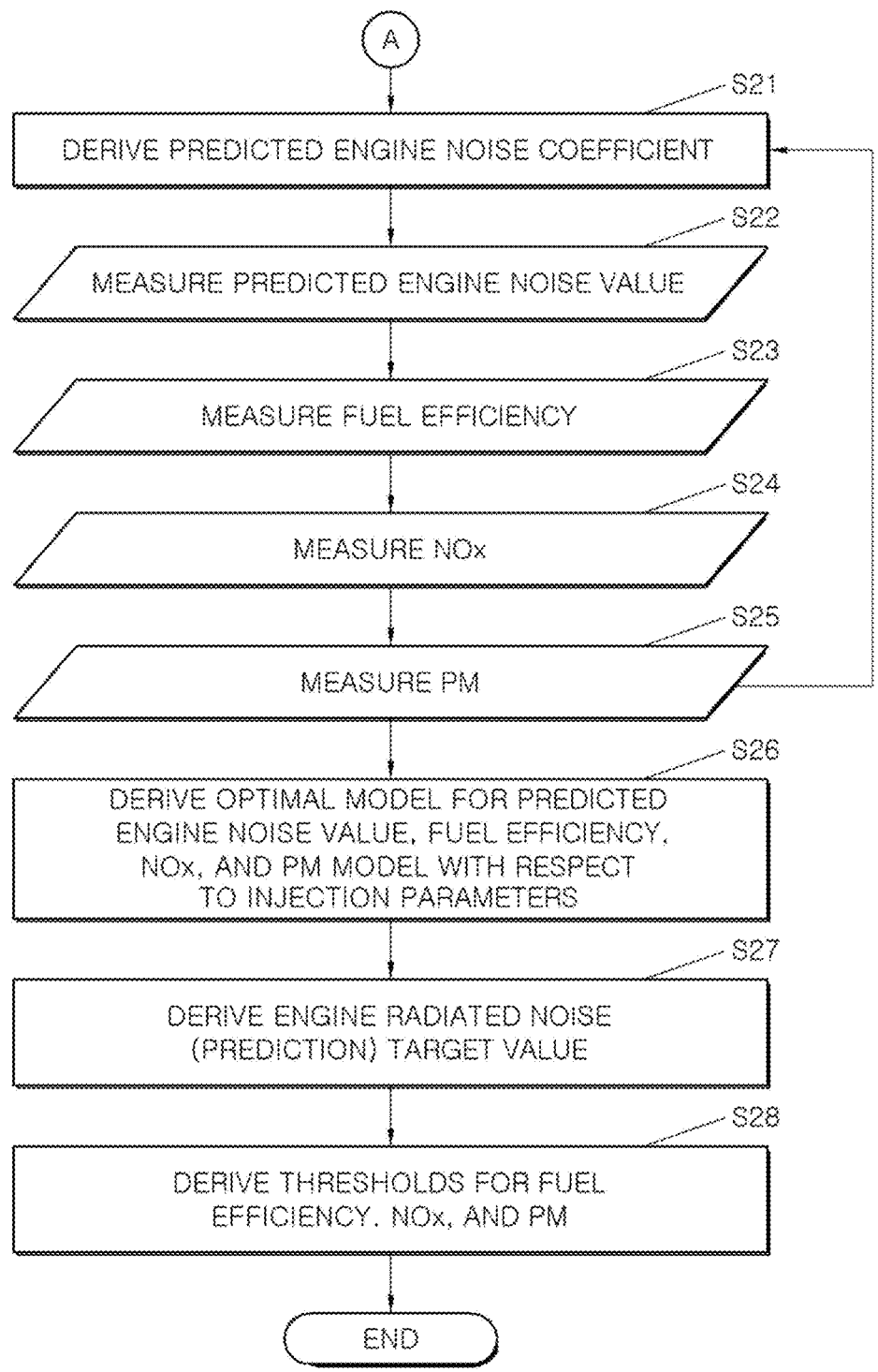

FIG. 8 is a flowchart illustrating a process of deriving an optimal model (DoE model) for fuel efficiency and discharge through an experiment of the existing engine test room.

First, an engine operation condition is set (S21), and a predicted engine noise value is measured in conditions in which the engine operates according to the engine operation condition (S22).

The predicted engine noise value is measured by the predicted engine noise coefficient is derived by the engine noise predicting device 11 in operation S15.

As such, fuel efficiency is measured with respect to each of the operation conditions by the fuel efficiency analyzer 13 (S23), and $NO_x$ and PM values are measured by the exhaust gas analyzer 12 (S24 and S25).

On the basis of these test results, the engine measuring device 20 derives the optimal model for fuel efficiency and discharge (models for the predicted engine noise value, fuel efficiency, $NO_x$, and PM) with respect to injection parameters (S26 and S27).

Furthermore, a threshold for each of a fuel efficiency value, a $NO_x$ value, and a PM value is derived (S28).

Figure 9A:
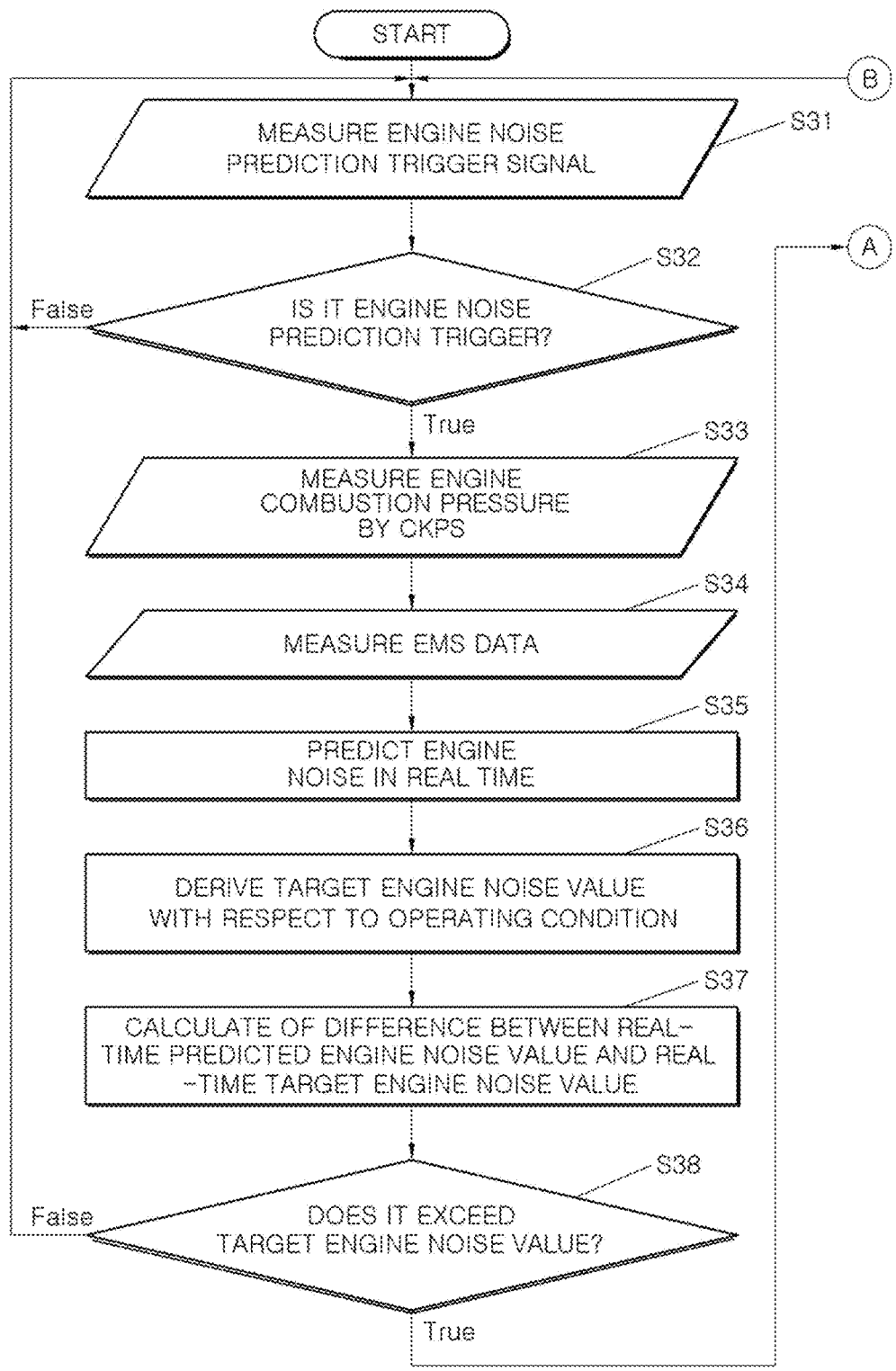
Figure 9B:
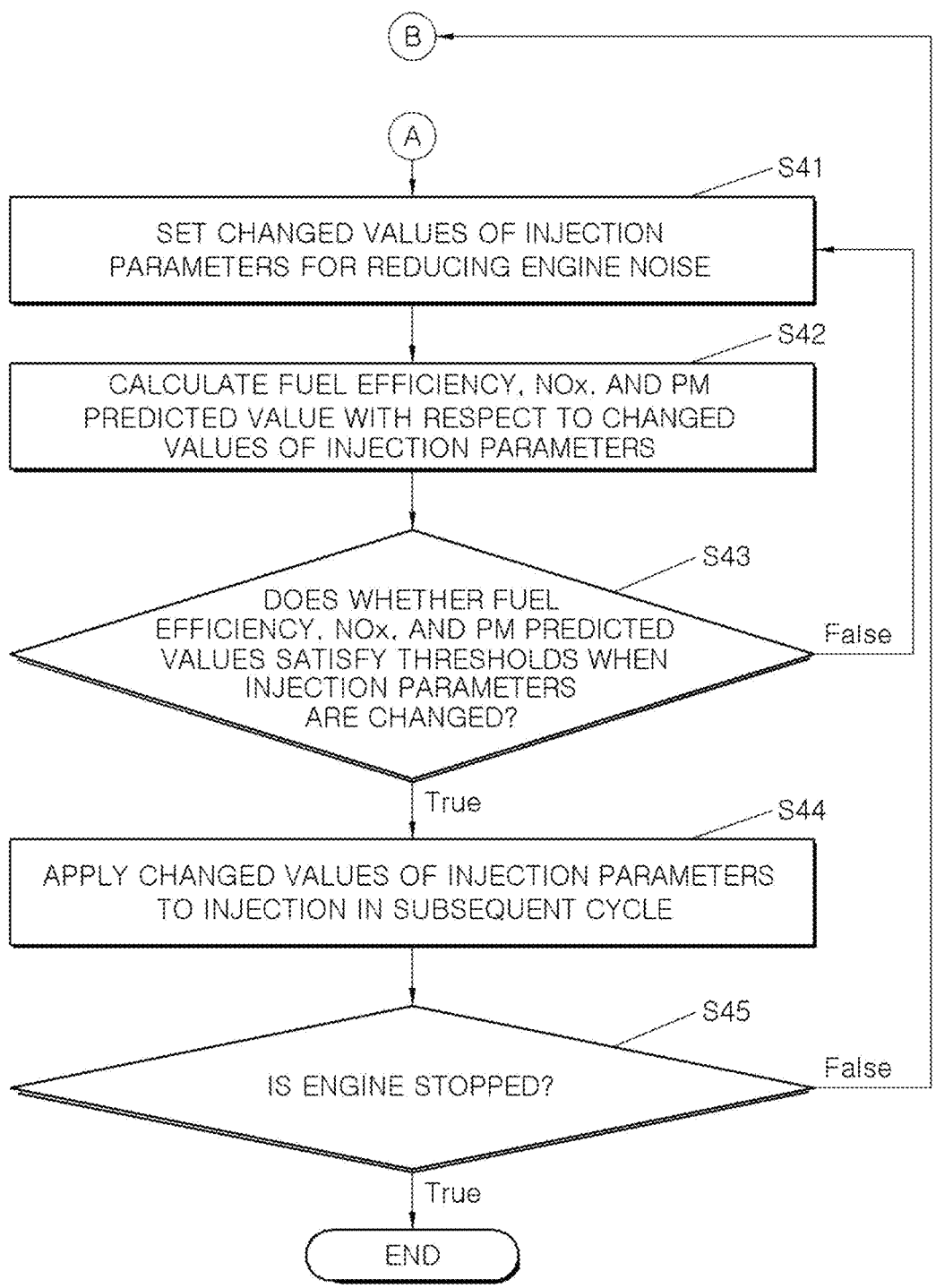

Lastly, fuel injection is controlled in real time through a noise prediction by a process shown in FIGS. 9A and 9B.

An engine noise prediction trigger signal is measured (S31). When an engine noise prediction trigger is generated (S32), an engine combustion pressure is derived by a measurement of the CKPS (S33) and EMS data stored in the ECU is measured (S34).

A real-time predicted engine noise value corresponding to the engine combustion pressure measured in operation S33 is derived by the predicted engine noise coefficient derived in operation S16 (S35), and a target engine noise value in a corresponding operation condition of the engine is derived from the EMS data measured in operation S34 (S36).

Subsequently, the combustion controller 30 determines a difference between the real-time predicted engine noise value and the real-time target engine noise value (S37) and compares the determined difference with a preset threshold, determining whether the predicted engine noise value exceeds the target engine noise value more than the threshold (S38).

As the determination result in operation S38, when the predicted engine noise value exceeds the target engine noise value more than the threshold, the target engine noise value is corrected, and changed values of the injection parameters are set according to the corrected target engine noise value (S41).

The injection parameter may include a main injection time, an injection pressure, an amount of pilot injection, and the like.

Furthermore, when the injection parameters are corrected in operation S41, it is determined whether a DoE model value (a predicted value for fuel efficiency, $NO_x$, or PM) according to a corresponding injection parameter satisfies the threshold derived in operation S28 (S43).

When the DoE model value does not satisfy a range of the thresholds derived in operation S28, the change values of the injection parameters are reset in operation S41 (S41).

As the determination result in operation S43, when the DoE model value satisfies the threshold, the fuel injection is controlled to be applied to injection in a subsequent cycle according to the changed injection parameters (S44). When the engine is stopped, the control method is terminated, and otherwise, the process of FIGS. 9A and 9B is repeated to control the fuel injection in real time by a closed loop (S45).

As described above, in accordance with various aspects of the present invention, the fuel injection is actively controlled in real time according to the predicted engine noise value such that the NVH performance may be improved, and the fuel injection is controlled to coincide with the optimal model for fuel efficiency and discharge such that it is possible to implement improvement in fuel efficiency and optimization of an exhaust gas.

In accordance with the noise control system and the control method for fuel injection by predicting engine noise of the present invention, the engine noise is predicted as accurately as possible and the fuel injection is controlled in consideration of the engine noise, fuel efficiency, and an exhaust gas such that it is possible to improve NVH performance and fuel efficiency and optimize the exhaust gas.

Furthermore, the fuel injection is controlled in real time, it is possible to actively control the fuel injection according to environmental changes and the like.

Furthermore, the noise control system and the control method for fuel injection by predicting engine noise of the present invention may be integrated with EMS such that an additional hardware configuration is not required.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A noise control system related to fuel efficiency and emission value by predicting engine noise, the noise control system comprising:

an engine noise predicting device configured to derive a real-time predicted engine noise value by a predicted engine noise coefficient which is pre-stored according to a currently measured combustion pressure value of an engine; and an engine control unit (ECU) configured to determine a difference between the real-time predicted engine noise value derived by the engine noise predicting device and a target engine noise value for a current operation condition of the engine, and when the engine noise is determined as being degraded due to an abnormal combustion, configured to change the target engine noise value to control the fuel efficiency and the emission value according to the changed target engine noise value.

2. The noise control system of claim 1,
wherein a combustion controller is configured to obtain the target engine noise value for the current operation condition of the engine by a map of the target engine noise value pre-stored in the electronic control unit.

3. The noise control system of claim 2,
wherein when the difference between the real-time predicted engine noise value derived and the target engine noise value for the current operation condition of the engine is equal to or greater than a predetermined threshold, the combustion controller is configured to determine the engine noise as being degraded due to the abnormal combustion.

4. The noise control system of claim 3,
wherein the combustion controller changes injection parameters including a main injection time and an injection pressure according to the changed target engine noise value, controlling a fuel injection.

5. The noise control system of claim 4,
wherein the real-time predicted engine noise coefficient includes data obtained by mapping the predicted engine noise value according to a combustion pressure of the engine.

6. The noise control system of claim 5,
wherein the real-time predicted engine noise coefficient includes data obtained by mapping the predicted engine noise value according to operation conditions of the engine including a rotation speed of the engine and a load of the engine.

7. The noise control system of claim 6, further including:
an engine measuring device configured to generate a model for fuel efficiency and discharge by modeling a value of fuel efficiency, a value of $NO_x$ value, and a value of particle matter (PM) which are measured according to the real-time predicted engine noise value.

8. The noise control system of claim 7,
wherein the combustion controller is configured to determine predicted values of the fuel efficiency, the $NO_x$, and the PM which correspond to the changed injection parameters according to the model for fuel efficiency and discharge and, when the predicted values of the fuel efficiency, the NOx, and the PM satisfy predetermined thresholds, the combustion controller is configured to control the fuel injection according to the changed injection parameters.

9. A control method for fuel injection by predicting engine noise, the control method comprising:
measuring a current combustion pressure of an engine;
deriving a real-time predicted engine noise value according to the current combustion pressure of the engine by a pre-stored predicted engine noise coefficient;
deriving a target engine noise value for a current operation condition of the engine;
determining a difference between the real-time predicted engine noise value and the target engine noise value for the current operation condition; and
determining when the engine noise is degraded due to an abnormal combustion.

10. The control method of claim 9,
wherein, when the difference between the real-time predicted engine noise value and the target engine noise value for the current operation condition of the engine is equal to or greater than a predetermined threshold, the determining of when the engine noise is degraded due to the abnormal combustion includes determining the engine noise as being in a degraded state.

11. The control method of claim 10, further including:
when the engine noise is determined as being in the degraded state, changing the target engine noise value and changing injection parameters including a main injection time and an injection pressure according to the changed target engine noise value.

12. The control method of claim 11,
wherein the deriving of the target engine noise value for the current operation condition of the engine includes deriving the target engine noise value by a map of a target engine noise value pre-stored in an electronic control unit (ECU).

13. The control method of claim 11,
wherein the pre-stored predicted engine noise coefficient includes data obtained by mapping the real-time predicted engine noise value according to the current combustion pressure of the engine.

14. The control method of claim 13,
wherein the pre-stored predicted engine noise coefficient includes data obtained by mapping the real-time predicted engine noise value according to operation conditions of the engine including a rotation speed of the engine and a load of the engine.

15. The control method of claim 14, further including:
determining a value of fuel efficiency, a value of $NO_x$, and a value of particle matter (PM) which correspond to the changed injection parameters obtained in changing the injection parameters according to a model for fuel efficiency and discharge obtained by modeling values of the fuel efficiency, the NOx, and the PM which are measured according to the real-time predicted engine noise value.

16. The control method of claim 15, further including:
determining when predicted values of the fuel efficiency, the $NO_x$, and the PM which are determined in determining the predicted values of the fuel efficiency, the $NO_x$, and the PM satisfy predetermined thresholds; and
when the predicted values of the fuel efficiency, the $NO_x$, and the PM satisfy predetermined thresholds, controlling the fuel injection according to the changed injection parameters.

* * * * *